United States Patent [19]
Reynolds

[11] 4,077,746
[45] Mar. 7, 1978

[54] HYDRAULIC INTENSIFIER SYSTEM

[75] Inventor: Richard W. Reynolds, Rockford, Ill.

[73] Assignee: Sundstrand Corporation, Rockford, Ill.

[21] Appl. No.: 460,120

[22] Filed: Apr. 11, 1974

[51] Int. Cl.² .................... F04B 17/00; F16D 31/02
[52] U.S. Cl. ................................ 417/225; 60/371; 60/419
[58] Field of Search ............... 417/225, 323; 60/371, 60/413, 414; 123/179 F

[56] References Cited

U.S. PATENT DOCUMENTS

| | | | |
|---|---|---|---|
| 2,190,812 | 2/1940 | Wahlmark | 417/226 |
| 2,452,470 | 10/1948 | Johnson | 417/225 |
| 2,554,381 | 3/1951 | Patterson | 60/413 |
| 2,628,476 | 2/1953 | Grier | 417/323 |
| 2,935,952 | 10/1960 | Rose | 417/225 |
| 3,096,619 | 7/1963 | Jennings et al. | 123/179 F |
| 3,130,540 | 4/1964 | Manning et al. | 60/413 |
| 3,188,963 | 6/1965 | Tyler | 417/225 |
| 3,192,717 | 7/1965 | Lee | 60/371 |
| 3,253,410 | 5/1966 | Albers | 60/419 |
| 3,811,281 | 5/1974 | Wise et al. | 60/413 |

*Primary Examiner*—William L. Freeh
*Attorney, Agent, or Firm*—Wegner, Stellman, McCord, Wiles & Wood

[57] ABSTRACT

A hydraulic intensifier system having an axial piston pump-motor unit with fluid control circuitry associated therewith including porting in the unit whereby hydraulic fluid supplied under pressure to the unit drives the unit, and with part thereof ported to an accumulator for intensification of pressure thereof in an intensify mode of operation. In a start mode, the higher pressure fluid from the accumulator is delivered to the unit to cause rotation of the unit in an opposite direction.

12 Claims, 5 Drawing Figures

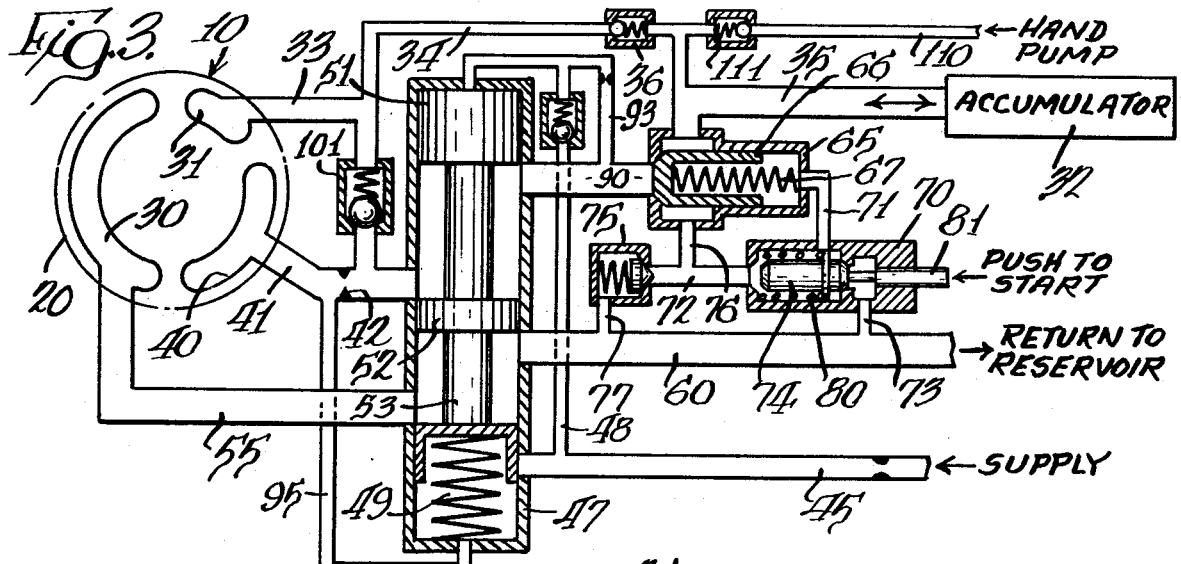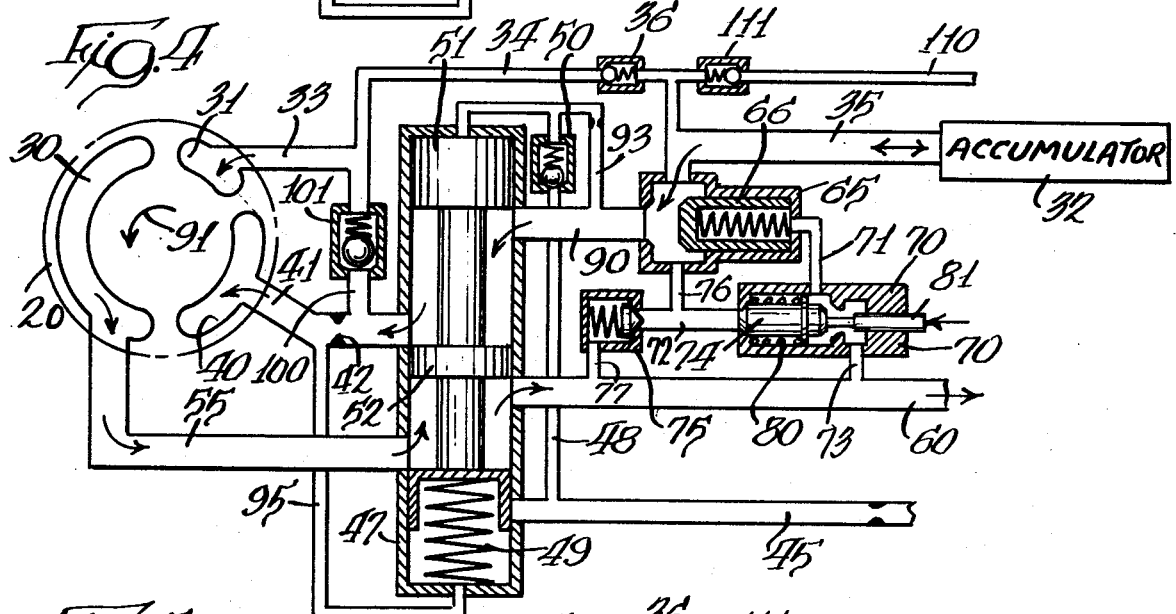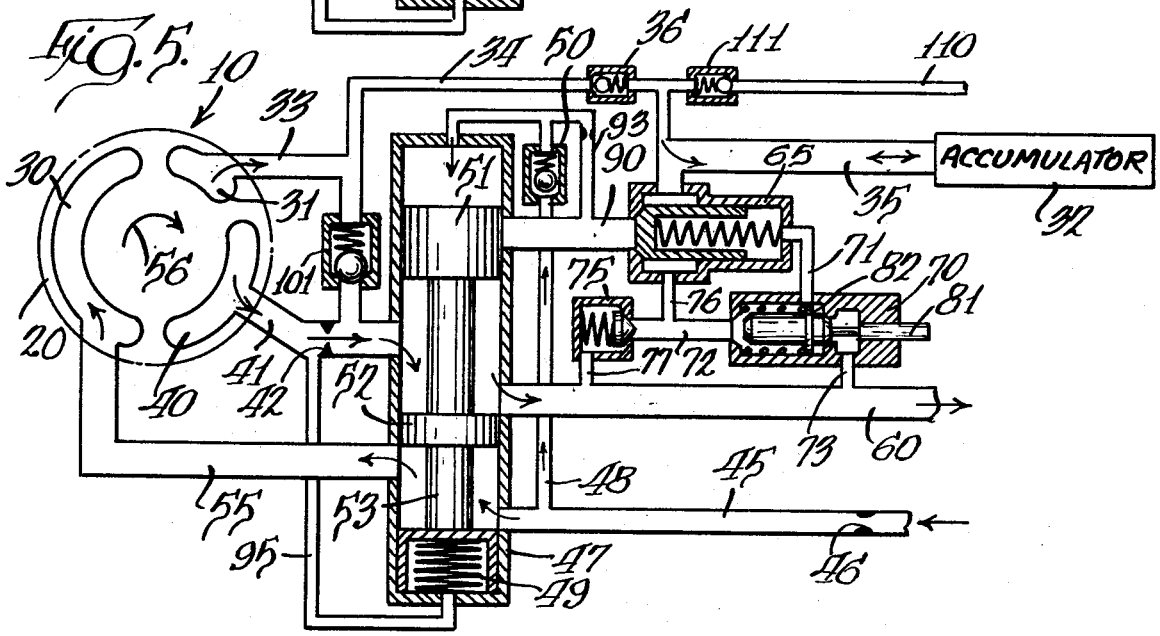

HYDRAULIC INTENSIFIER SYSTEM

BACKGROUND OF THE INVENTION

This invention pertains to a hydraulic intensifier system and, more particularly, to a motor-pump unit having porting whereby the unit can operate for intensification of pressure of fluid delivered thereto under pressure to provide for an increased pressure in a part of the fluid with the remainder of the fluid devliered to the unit used as motive power for the unit and wherein the unit can also operate in a reverse direction in a start mode as driven by the intensified pressure fluid.

The prior art has many types of pressure boosters. One type of pressure booster is the reciprocating piston type, such as shown in U.S. Pat. Nos. 2,296,647, 2,484,884, and 2,652,780. Pressure boosters using rotatable members are shown in U.S. Pat. Nos. 2,935,952, 3,133,503, and 3,188,963 wherein plural sets of axial pistons are provided with one set being used as a motor and the other set as a pump. U.S. Pat. No. 3,079,864 discloses a rotatable unit with radially movable slippers wherein elements of the unit perform similarly to a vane-type unit in the motor function and with the elements functioning as radial pistons for obtaining pressure intensification.

The prior art also includes U.S. Pat. Nos. 2,832,199 and 3,128,707 wherein multiple porting is provided in order to obtain separate flows from a pump.

SUMMARY

A primary feature of the invention disclosed herein is to provide a hydraulic intensifier system wherein a single motor-pump unit is rotated in one direction by supply of pressure fluid thereto and, in an intensify mode, the unit functions to intensify the pressure with respect to part of the fluid delivered to the unit, with this intensified fluid being storable in a unit, such as an accumulator. The balance of the fluid delivered to the unit is delivered to a return line leading to a reservoir or the like.

An additional feature of the invention is in the reversability of operation of the system whereby, in a start mode, control circuitry associated with the motor-pump unit is rendered effective to return fluid stored at a high pressure to the motor-pump unit for causing rotation thereof in a direction opposite to the rotation when in an intensify mode. In such a system, there is an auxiliary power capability wherein the pressure of fluid stored in the accumulator is built up in normal operation of the equipment having the auxiliary power unit. The stored power is usable when required.

Still another feature of the invention is to provide a motor-pump unit, as usable in a hydraulic intensifier system, having a rotatable member with means defining a plurality of fluid chambers including a plurality of elements movably carried by the member, a single inlet port for delivering fluid under pressure to successive fluid chambers during rotation of the member, and second and third ports with one of the latter ports leading to an accumulator for storing pressure fluid at a pressure higher than that of the supply to the unit and with the other of said latter ports being connected to a return line to reservoir whereby fluid delivered to a chamber is used to cause the unit to operate as a motor and with a portion of the fluid in each chamber subsequently being delivered to an accumulator at a higher pressure and with the balance of the fluid in each of the chambers being delivered to a return line as part of the motor function of the unit.

BRIEF DESCRIPTION OF THE DRAWINGS

FIG. 3 is a schematic drawing of the hydraulic intensifier system shown in a non-operating mode;

FIG. 4 is a view, similar to FIG. 3, showing circuit components positioned for operation in a start mode; and FIG. 5 is a view, similar to FIG. 3, showing the circuit components positioned for operation in an intensify mode.

DESCRIPTION OF THE PREFERRED EMBODIMENT

Figure 1:
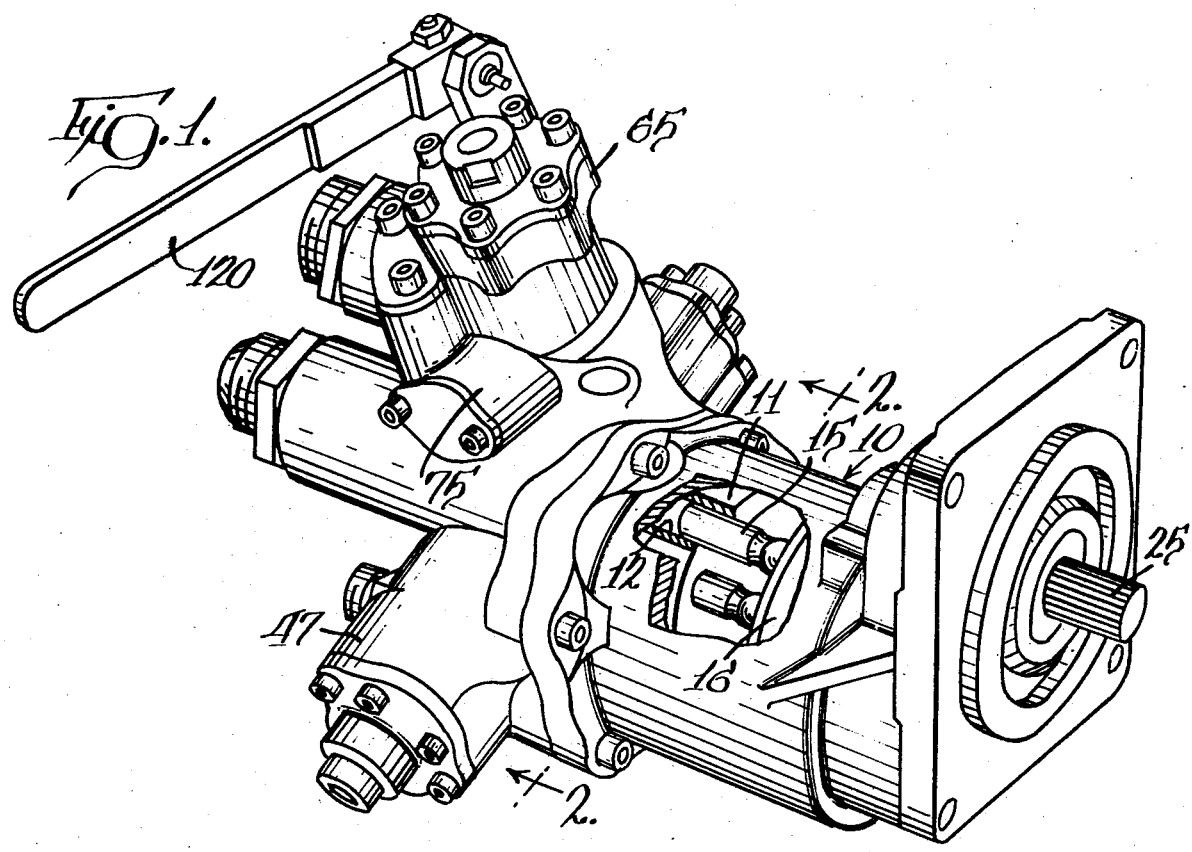
FIG. 1 is a perspective view, with parts broken away, of mechanism the hydraulic intensifier system.
Figure 2:
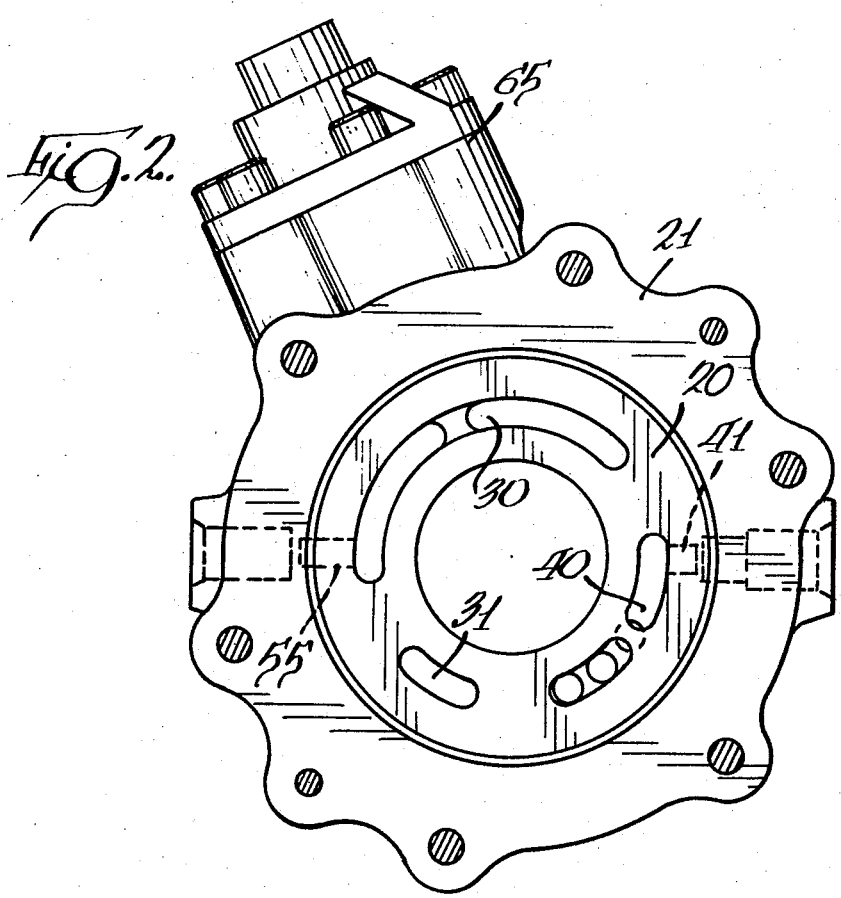
FIG. 2 is a vertical section, taken generally along the line 2—2 in FIG. 1 and on an enlarged scale.

The hydraulic intensifier system has, as a basic component thereof, a motor-pump unit, indicated generally at 10 in FIG. 1, which, as shown, is an axial piston unit. A rotatable member 11, in the form of a block, has a plurality of cylinders 12, each of which mounts a reciprocable pump element, in the form of a piston 15, which is moved through a stroke, during rotation of the block 1 by a cam means in the form of a swashplate 16. The swashplate provides two dead center positions with rotation of the block 11 resulting in full retraction of the pistons in approximately one-half revolution and full extension in the other one-half revolution. The open ends of the cylinders 12 are exposed to a port plate 20 secured within a part of the casing 21 of the unit.

A splined shaft 25 is interconnected by gearing with the rotatably-mounted shaft carrying the rotatable member 11 whereby rotation of the block 11 results in rotation of the splined shaft 25 as in conventional in an axial piston-type motor.

The foregoing structure is conventional in the art for an axial piston-type motor-pump unit with the particular operation thereof dependent upon the controls associated therewith.

The control circuit disclosed herein provides for a hydraulic intensification system wherein the motor-pump unit can operate either in an intensify mode or a start mode and with there being a special construction of the port plate 20 to enable this operation.

As an example, the system is usable as a light-weight starting system for a gas turbine auxiliary power unit. The splined shaft 25 may be connected to an engine through a clutch (not shown) whereby, in the intensify mode, rotation of the shaft 25 does not place any torque on the engine. In a start mode, there is rotation of the shaft 25 in the opposite direction to provide starting torque to the engine of the auxiliary power unit.

The system is illustrated in FIG. 3 wherein the motor-pump unit 10 has the port plate 20 with a first arcuate elongate port 30 which communicates with fluid chambers defined by the cylinders 12 in the block 11 as the size of the chambers in changing between maximum and minimum volume in approximately one-half revolution of the block. The port plate 20 has a second port 31 which connects with an accumulator 32 by a plurality of lines 33, 34 and 35, with a oneway check valve 36 permitting fluid to flow toward the accumulator. A third port 40 in the port plate 20 communicates with a line 41 having a flow-restricting orifice 42 therein. The second and third ports communicate with the fluid chambers in the block 11 as the volume thereof varies between minimum and maximum values in the other one-half revolution of the block.

Referring particularly to FIG. 5, the control circuit components are shown in operative position for operating in an intensify mode. In such mode, a supply line 45, having a flow-restricting orifice 46, is connected to a power source for providing fluid under pressure, as an example 3,000 psi. The line 45 extends to a valve casing 47 housing a spring-urged shuttle valve 53 with a branch line 48 leading to an end of the valve casing 47 whereby pressure in the branch line 48 acts oppositely to the force of a spring 49 within the valve casing 47. The branch line 48 has a check valve 50 preventing reverse flow through branch line 48 to the supply line 45. The shuttle valve member 53 has lands 51 and 52. In the position of FIG. 5, supply pressure acts against land 51 to overcome the force of spring 49 and the land 52 is positioned whereby supply fluid can pass to a line 55 leading to the first port 30 in the port plate 20. This flow to the fluid chambers of the motor-pump unit results in rotation of the block 11 in the direction of arrow 56.

The elements 15 cross dead center between the first port 30 and the second port 31 and as the member 11 rotates in the direction of arrow 56 the size of the fluid chambers progressively decreases. This decrease in size of the fluid chambers delivers a portion of the fluid out of second port 31 to the line 33, with supply of this fluid to the accumulator 32, with resultant increase in pressure of the fluid to a value in excess of that of supply pressure and, as an example, 8,000 psi. Further rotation of the member 11 delivers successive fluid chambers into communication with the third port 40 in the port plate 12 and with additional decrease in the size of the fluid chambers. Fluid flows from these chambers through the third port 40 to a return line 60 by flow through line 41 and through the valve casing 47, as indicated by the flow direction arrows in FIG. 5.

Thus in the intensify mode of FIG. 5, supply fluid under an available pressure is delivered to the motor-pump unit to cause the unit to function as a motor to, in effect, self-drive the unit and obtain a pumping action to increase the pressure of fluid to be stored in the accumulator until use thereof is required.

The flow-restricting orifice 46 in the supply line 45 functions to restrict the top speed of the motor-pump unit in the event there is no back pressure at the second port 31.

When the stored fluid is to be used for starting the engine, for example, the control circuitry is positioned in a start mode, as shown in FIG. 4.

The control circuitry includes a start valve 65 having a valve member 66 urged by a spring 67 to the normally-closed position shown in FIG. 3. When in closed position, the valve member 66 has a small part of the left-hand end thereof, as viewed in FIG. 3, subjected to the pressure of fluid stored in the accumulator. However, the valve member is blocked against movement by a pilot valve 70 and maintained in a closed position by the spring 67. The pilot valve 70 is connected to the start valve by a connecting line 71. This line 71 is connectable to either a line 72 or a line 73, dependent upon the position of a valve member 74 of the start valve. The line 72 connects to the return line 60 through a high pressure relief valve 75, with this valve also being in constant communication with the accumulator 32 through a line 76 passing through the start valve 65 and connecting with the line 35. This high pressure relief valve permits bleed of fluid from the accumulator when an excessive pressure is created, such as upon a temperature increase. The outlet side of the high pressure check valve is connected by a line 77 to the return line 60.

The valve member 74 of the pilot valve is normally urged to the right and to the position shown in FIG. 3 by a spring 80 acting on a land 82 and can be shifted to the left to initiate start operation by depression of a pin 81 which changes the connection of line 71 leading from the start valve to communicate with line 73 extending to the return line 60. This bleeds fluid from the righ-hand end of the start valve whereby pressure acting on the left-hand end of the valve member 66 of the start valve shifts the start valve to the position shown in FIG. 4. Resultingly, fluid at high pressure flows from the accumulator 32 through the line 35 through the start valve to a line 90 connecting to the valve casing 47. With the valve land 51 in its uppermost position, flow is then through the valve to the line 41 and through the flow-restricting orifice 42. This delivers fluid under pressure to the third port 40 whereby the motor-pump unit is caused to rotate in the direction of arrow 91, which is in a direction opposite to the direction of rotation shown in FIG. 5. A line 93 branches off from line 90 and leads to the upper end of the valve casing 47 to apply the high pressure against land 51. This force acts in opposition to the sum of the force of the spring 49 and a force against the lower end of valve member 53 by pressure delivered to a line 95 connected to the line 41 downstream of the flow-restricting orifice 42 and leading to the opposite end of the valve casing 47. This provides an indication of speed of rotation of the splined shaft 25 whereby, at a desired speed, the pressure drop across the flow-restricting orifice 42 will be sufficient to result in shifting the valve land 51 downwardly and terminate delivery of fluid to the third port 40. During delivery of fluid to the third port 40, there is also delivery of fluid to the second port 31 by flow through a line 100 and a check valve 101 which connects to the line 33 communicating with the second port 31. This positioning of the valve land 51 also modulates the flow to the motor-pump unit.

The positions of the valve components in a non-operating mode are shown in FIG. 3. Release of the start pin 81 permits pressure fluid from line 76 to pass through pilot valve 70 and line 71 to close the start valve 65 and change the circuit from the start mode to the non-operating mode.

An alternate mode of charging the accumulator 32 is shown in FIGS. 3-5 wherein a line 110 connects to the line 35 through a check valve 111 and the line 110 can have a hand pump connected thereto whereby operation of the hand pump delivers fluid to the accumulator 32.

The components are shown generally in FIG. 1 wherein a start handle 120 is pivotally mounted in a position to overlie the start pin 81 whereby lowering of the handle depresses the start pin 81 to shift the pilot valve member 74 to the position shown in FIG. 4.

In brief summary, in the intensify mode of FIG. 5, fluid under pressure is delivered to the first port 30 to drive the member 11 carrying the pistons in the direction of the arrow 56, with the second port 31 functioning as a pumping port supplying pressure fluid to the accumulator 32 at a pressure higher than supply pressure and with the port 40 utilized as a return port which, through return line 60, returns fluid to a reservoir.

Thus, the motor-pump unit functions as both a motor and pump, with use of the same fluid chambers provided by the cylinders 12 in the block 11 for both motor and pump action. The relationship of the supply pressure to the pressure built up in the accumulator is approximately an inverse ratio of the length of first port 30 to the length of the second port 31.

For example, when a turbine engine of the type utilized in jet powdered aircraft is to be started, the handle 120 is operated, resulting in opening of the start valve to perform the start operation shown in FIG. 4 to provide a starting capability with high pressure fluid delivered from the accumulator 32.

Although the second port 31 is shown as the intensification port and the third port 40 is shown as the return port in the intensify mode, the system will operate equally well if these two ports are reversed whereby part of the fluid is delivered from the fluid chambers to the return line in advance of delivery of pumped fluid to the line leading to the accumulator.

I claim:

1. A hydraulic intensifier and motor system comprising, a casing, a member rotatable in said casing and having a plurality of cylinders, a piston movably mounted in each cylinder, cam means for stroking said pistons in said cylinders, a plurality of independent ports positioned for communication with one or more of said cylinders at certain rotational positions of said member including a first port, a second port and a third port with said first port having the greatest effective length, a first line, a second return line and a third line having a non-return check valve and an accumulator, and a control circuit including valve means operable in an intensify mode with rotation of the member in one direction for delivering fluid pressure in said first line to said first port to rotate said member, and to connect said second and third ports to the return line and the third line respectively, said control circuit including means to utilize high pressure fluid stored in said accumulator in a start mode for delivery to said cylinders to rotate said member in an opposite direction, a start valve operable to bypass said check valve and connect said accumulator to said cylinders and a pilot valve for operating said start valve.

2. A hydraulic intensifier and motor system comprising, a casing, a member rotatable in said casing and having a plurality of cylinders, a piston movably mounted in each cylinder, cam means for stroking said pistons in said cylinders, a plurality of independent ports positioned for communication with one or more of said cylinders at certain rotational positions of said member including a first port, a second port and a third port with said first port having the greatest effective length, a first line, a second return line and a third line having a non-return check valve and an accumulator, and a control circuit including valve means operable in an intensify mode with rotation of the member in one direction for delivering fluid pressure in said first line to said first port to rotate said member, and to connect said second and third ports to the return line and the third line respectively, said control circuit including means to utilize high pressure fluid stored in said accumulator in a start mode for delivery to said cylinders to rotate said member in an opposite direction, said valve means including a shuttle valve spring-urged in one direction and with means for applying opposing fluid pressures thereto to limit the speed of rotation of said member in the start mode.

3. A system as defined in claim 2 wherein said means for applying opposing fluid pressures includes an orifice disposed between said accumulator and the one of said ports which receives fluid from the accumulator.

4. A hydraulic intensifier and motor system comprising, a casing, a plural piston motor-pump unit including a member rotatable in said casing and having a plurality of cylinders, a piston movably mounted in each cylinder, cam means for stroking said pistons in said cylinders, a port plate with a plurality of independent arcuate ports positioned for communication with one or more of said cylinders at certain rotational positions of said member including a first port, a second port and a third port with said first port having the greatest effective length, a first line, a second return line and a third line having an accumulator, a control circuit including valve means operable in an intensify mode with rotation of the member in one direction for delivering fluid pressure in said first line to said first port to rotate said member and to connect said second and third ports to one or the other of the return line and the accumulator respectively, and a one-way check valve in said third line to prevent fluid flow from the accumulator back to one of said second and third ports, said control circuit including means operable in a start mode to utilize high pressure fluid stored in said accumulator for delivery to said cylinders to rotate said member in an opposite direction, a start valve operable to connect said accumulator to said second and third ports and a pilot valve for operating said start valve.

5. A hydraulic intensifier and motor system comprising, a casing, a plural piston motor-pump unit including a member rotatable in said casing and having a plurality of cylinders, a piston movably mounted in each cylinder, cam means for stroking said pistons in said cylinders, a port plate with a plurality of independent arcuate ports positioned for communication with one or more of said cylinders at certain rotational positions of said member including a first port, a second port and a third port with said first port having the greatest effective length, a first line, a second return line and a third line having an accumulator, a control circuit including valve means operable in an intensify mode with rotation of the member in one direction for delivering fluid pressure in said first line to said first port to rotate said member and to connect said second and third ports to one or the other of the return line and the accumulator respectively, and a one-way check valve in said third line to prevent fluid flow from the accumulator back to one of said second and third ports, said control circuit including means operable in a start mode to utilize high pressure fluid stored in said accumulator for delivery to said cylinders to rotate said member in an opposite direction, said valve means including a shuttle valve spring-urged in one direction and with means for applying opposing fluid pressures thereto to limit the speed of rotation of said member in the start mode.

6. A system as defined in claim 5 wherein said shuttle valve is spring-urged to a position in the start mode to connect said first port with the return line and block said first line.

7. A system as defined in claim 5 wherein said means for applying opposing fluid pressures to said shuttle valve includes an orifice disposed between said accumulator and one of said ports which receives fluid from the accumulator.

8. A hydraulic intensifier and motor system comprising, a housing, a cylinder block rotatable in the housing, a shaft rotatable with the cylinder block and extending outwardly from the housing, a plurality of cylinders in the cylinder block, each having a piston reciprocable therein, cam means for stroking the pistons in said cylinders during rotation of said cylinder block, a port plate with a plurality of angularly-spaced independent arcuate ports positioned for communication successively with the cylinders during rotation of the cylinder block including, a first port communicating with the cylinders during movement of the pistons in one direction in the cylinders, and second and third ports communicating with the cylinders during movement of the pistons in the opposite direction in the cylinders, a first line for supplying fluid under pressure from a source to the system, a second line including an accumulator, a third line for returning fluid to the source, and valve means positionable in an intensify mode to communicate first, second and third ports respectively with said first, second and third lines to charge said accumulator, said valve means positionable in a start mode to communicate said first port with said third line and communicate said second and third ports with said second line to rotate said shaft.

9. A system as defined in claim 8 wherein said valve means includes a pressure-responsive valve member positionable in the intensify mode in response to pressure in said first (supply) line to connect said first port with said first line and connect said third port with said third (return) line.

10. A system as defined in claim 9 including spring means urging said valve member to a position connecting said first port to said third (return) line and connecting said third port to said second (accumulator) line in the absence of pressure in said first line, a restrictive orifice between the third port and the valve member, and means for sensing the pressure drop across said restrictive orifice during the start mode to move the valve member aginst the urging of the spring upon attainment of return flow from the accumulator to the third port.

11. A system as defined in claim 10 including a manually selectively operable start valve between the pressure-responsive valve member and the second (accumulator) line for connecting the accumulator with the pressure-responsive valve member during the start mode.

12. A hydraulic intensifier and motor system comprising, a housing, a cylindrical member rotatable in the housing, a shaft rotatable with the cylindrical member and extending outwardly from the housing, means defining a plurality of fluid chambers which vary in volume during rotation of said cylindrical member including a plurality of cavities in said cylindrical member with a reciprocally movable member in each of said cavities, cam means for stroking the reciprocally movable members in said cavities during rotation of said cylindrical member, a port plate with a plurality of angularly spaced independent arcuate ports positioned for communication successively with the fluid chambers during rotation of said cylindrical member including, a first port communicating with the fluid chambers during movement of the reciprocally movable members in one direction in the cavities, and second and third ports communicating with the fluid chambers during movement of the reciprocally movable members in the opposite direction in the cavities, a first line for supplying fluid under pressure from a source to the system, a second line including an accumulator, a third line for returning fluid to the source, and valve means positionable in an intensify mode to communicate first, second and third ports respectively with said first, second and third lines to charge said accumulator, said valve means positionable in a start mode to communicate said first port with said third line and communicate said second and third ports with said second line to rotate said shaft.

* * * * *